US010690976B2

(12) United States Patent
Asatani (10) Patent No.: US 10,690,976 B2
(45) Date of Patent: Jun. 23, 2020

(54) DISPLAY DEVICE

(71) Applicant: SHARP KABUSHIKI KAISHA, Sakai, Osaka (JP)

(72) Inventor: Shuichiro Asatani, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/261,461

(22) Filed: Jan. 29, 2019

(65) Prior Publication Data

US 2019/0235289 A1    Aug. 1, 2019

(30) Foreign Application Priority Data

Jan. 31, 2018  (JP) .................. 2018-015131

(51) Int. Cl.
*G02F 1/1362* (2006.01)
*G02F 1/1335* (2006.01)
*F21V 8/00* (2006.01)

(52) U.S. Cl.
CPC .. *G02F 1/136204* (2013.01); *G02F 1/133512* (2013.01); *G02F 1/133528* (2013.01); *G02B 6/0051* (2013.01); *G02B 6/0053* (2013.01); *G02F 2001/133562* (2013.01); *G02F 2001/133567* (2013.01); *G02F 2201/46* (2013.01)

(58) Field of Classification Search
CPC ......... G02F 1/136204; G02F 1/133528; G02F 1/133512; G02F 2001/133562; G02F 2201/46; G02F 2001/133567; G02B 6/0051; G02B 6/0053
See application file for complete search history.

(56) References Cited

U.S. PATENT DOCUMENTS

| 2010/0225849 A1* | 9/2010 | Takeuchi | G02B 6/0023 349/62 |
| 2016/0334900 A1* | 11/2016 | Heikkinen | G06F 3/0412 |
| 2019/0087047 A1* | 3/2019 | Zou | G06F 3/0414 |

FOREIGN PATENT DOCUMENTS

JP    2002-258763 A    9/2002

* cited by examiner

*Primary Examiner* — Phu Vu
(74) *Attorney, Agent, or Firm* — ScienBiziP, P.C.

(57) ABSTRACT

A display device includes a display panel, an optical member, a fixing member, and a control substrate. The display panel is capable of displaying an image. The optical member imparts predetermined optical effects to light emitted toward the display panel. The fixing member fixes the optical member to another member. The control substrate controls display of the image. The control substrate includes a ground section including a conductor pattern. The fixing member has electrical conductivity and electrically connects the optical member directly or indirectly to the ground section.

8 Claims, 8 Drawing Sheets

DISPLAY DEVICE

CROSS REFERENCE TO RELATED APPLICATION

This application claims priority from Japanese Patent Application No. 2018-015131 filed on Jan. 31, 2018. The entire contents of the priority application are incorporated herein by reference.

TECHNICAL FIELD

The technology described herein relates to a display device.

BACKGROUND

A display device that displays an image usually has optical members disposed therein. The optical members utilize the properties and action of light to impart predetermined optical effects (such as polarization, reflection, selective reflection, light shielding, and wavelength conversion) to light that is emitted toward a display panel that displays an image. For example, in a liquid crystal display device including a liquid crystal panel (a type of display panel) that is capable of displaying an image and a lighting device that illuminates the liquid crystal panel with light, the liquid crystal panel has polarizing plates, provided on a front surface (i.e. an image display surface on which an image is displayed) thereof and a back surface (i.e. a surface opposite to the front surface) thereof, that selectively transmit only light that oscillates in a particular direction. Further, the lighting device, attached to the back side of the liquid crystal panel, has disposed therein optical sheets such as a diffusion sheet, a lens sheet, a prism sheet, a reflection sheet as well as a light guide plate that lets in light emitted from a light source and, while guiding the light through the inside thereof, causes the light to exit toward the display panel in the form of surface light. It should be noted that those of the plate-shaped optical members each of which is formed so that its thickness is sufficiently small with respect to the area of its plate surface are sometimes herein referred to as "optical sheets."

In recent years, there has been a strong demand for a slimming down of display devices such as mobile terminal devices and TV reception devices. Conventionally, the clearance between constituent members that constitute a display device has been kept in a certain size or larger. However, along with a further slimming down of display devices, constituent members per se are slimmed down, and the clearance between constituent elements is reduced.

When constituent members are stacked in proximity to each other, static electricity generated in the process of manufacture or use exerts a non-negligible effect on the interaction between the adjacent constituent members. A deformation or the like of an optical member due to electrostatic interaction affects the optical action of the optical member to cause deterioration in display quality. In particular, in a case where at least either of the optical members is an optical sheet formed to be comparatively thin and flexible, the optical sheet bends and deforms toward the other optical member and adheres partially to the other optical member. For example, electrostatic attractive force generated between the polarizing plate disposed on the back side of the liquid crystal panel and an optical sheet disposed on a side of the lighting device that is closest to the liquid crystal panel causes the optical sheet to contain air or the like in the space between the optical sheet and an optical member and deform into the shape of a lens to effect interference of light that undesirably creates a pattern of light called a Newton ring.

In view of this, for example, Japanese Unexamined Patent Application Publication No. 2002-258763 discloses a technology, directed to a direct backlight device having linear light sources disposed on a back side of a diffuser, in which the diffuser is provided with a light-shielding pattern that serves as a lighting curtain for increasing the uniformity of light by shielding an intense range of light from the linear light sources and at least a part of the light-shielding pattern is formed by a conductor and connected to the ground.

Japanese Unexamined Patent Application Publication No. 2002-258763 fails to describe a specific configuration for dissipating, out of the display device, electricity guided from the diffuser to the light-shielding pattern. In particular, in a case where the lighting device has a housing made of insulating resin or the like, newly providing a dedicated ground wire and connecting it to each light-shielding pattern makes it impossible to avoid making the liquid crystal display device complex in structure and manufacturing process. Further, although it is desirable that the new ground wire be provided in a frame (i.e. an image non-display section surrounding an image display surface) of the liquid crystal panel, it is not preferable, from the point of view of achieving a narrower frame, to reserve such a space.

SUMMARY

The technology described herein was made in view of the above circumstances. An object is to reduce the build-up of electricity on an optical member by effectively dissipating electricity built up on the optical member out of a display device with a simple configuration.

A display device includes a display panel, an optical member, a fixing member, and a control substrate. The display panel is capable of displaying an image. The optical member imparts predetermined optical effects to light emitted toward the display panel. The fixing member fixes the optical member to another member. The control substrate controls display of the image. The control substrate includes a ground section including a conductor pattern. The fixing member has electrical conductivity and electrically connects the optical member directly or indirectly to the ground section.

According to the foregoing configuration, the optical members are electrically connected to the ground section of the control substrate, whereby electricity built up on the optical members can be dissipated out of the display device through the ground section and the decline in display quality due to the build-up of electricity on the optical members can be reduced. Since the existing ground section of the control substrate is used to dissipate electricity out of the display device, it is not necessary to newly provide a dedicated ground wire. This makes it possible to prevent the display device from becoming complex in configuration due to an antistatic structure of an optical member and makes it unnecessary to secure a new wiring space. It is also preferable, from the point of view of shortening a path of conduction that needs to be newly formed and preventing the manufacturing process from becoming complex, that the optical members be connected to the ground section of the control substrate disposed in proximity to the optical members. Further, by using the fixing member, which serves to fix the optical members, to electrically connect the optical members to the ground section, an antistatic structure can be formed without the need for a new dedicated member. This makes it possible to prevent an increase in the number of components that constitute the display device.

The technology described herein makes it possible to obtain a high-display-quality thin display device as a result of preventing the build-up of electricity on an optical member.

DETAILED DESCRIPTION

First Embodiment

A first embodiment is described with reference to FIGS. 1 to 3.

The first embodiment illustrates a liquid crystal display device (an example of a display device) 1. It should be noted that some of the drawings show an X axis, a Y axis, and a Z axis and are drawn so that the direction of each axis is an identical direction in each drawing. Further, FIG. 1 shows the front side up (and the back side down), and as for identical members, one of the members may be given a sign, and the other members may not be given signs (the same applies to a second embodiment and a third embodiment).

[Liquid Crystal Display Device 1]

Figure 1:
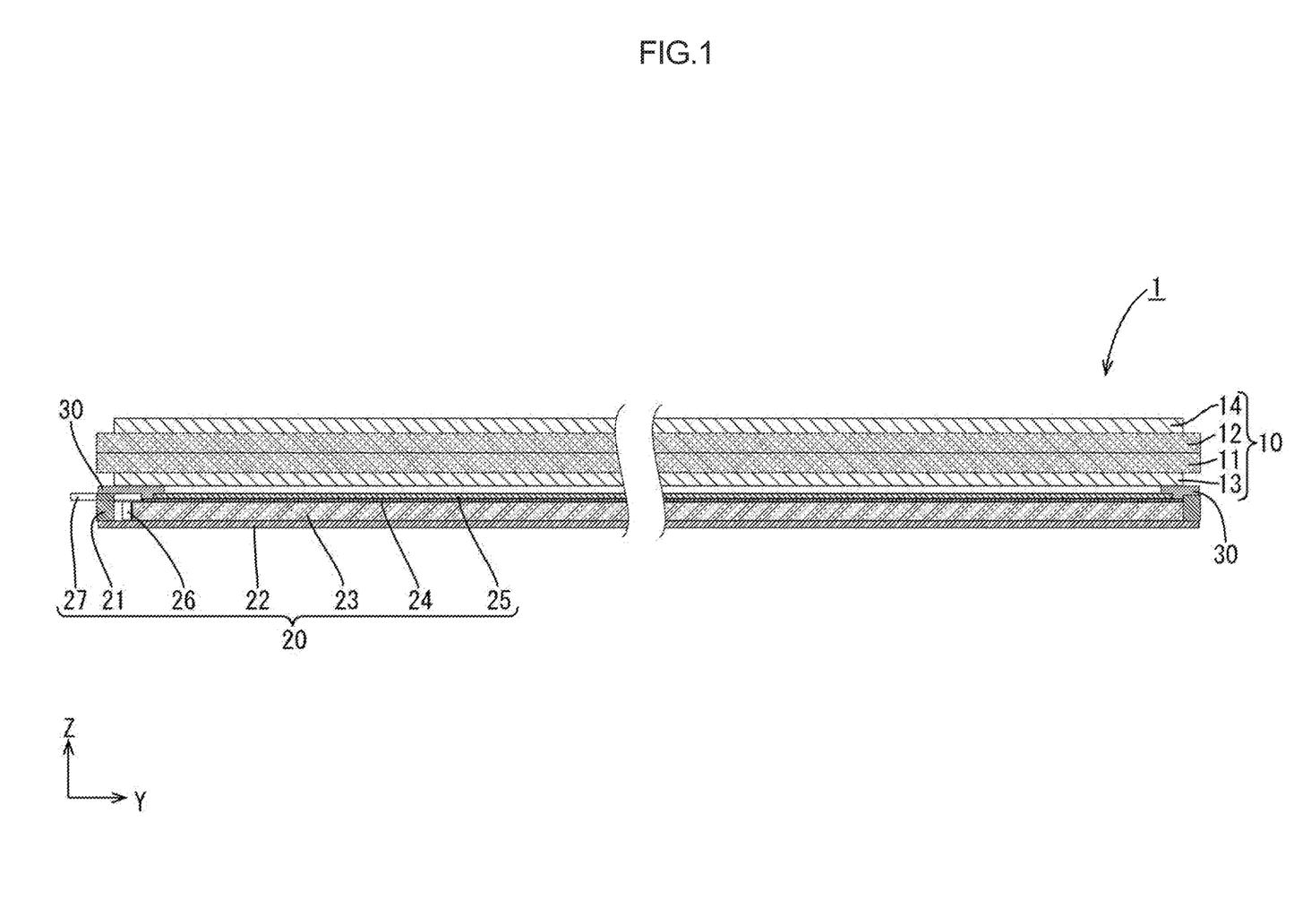
FIG. 1 is a schematic view schematically illustrating a cross-sectional configuration of a liquid crystal display device according to a first embodiment.

As shown in FIG. 1, the liquid crystal display device 1 according to the first embodiment includes a liquid crystal panel (an example of a display panel) 10 and a backlight device (an example of a lighting device) 20, and is configured such that the liquid crystal panel 10 and the backlight device 20 are fixed to each other by a liquid crystal panel fixing tape (an example of a fixing member) 30 or the like. The liquid crystal display device 1 according to the first embodiment has an outline of a rectangular flat plate shape as a whole. The following description assumes that the rectangular flat plate shape has its short side direction extending along the X axis, its long side direction extending along the Y axis, and its thickness direction (front-back direction) extending along the Z axis.

[Liquid Crystal Panel 10]

As the liquid crystal panel 10, a liquid crystal panel of a well-known configuration can be used without any particular limitation.

Although not illustrated in detail, the liquid crystal panel 10 according to the first embodiment includes two substrates 11 and 12 bonded together with a predetermined gap (not illustrated in FIG. 1) therebetween and liquid crystals (not illustrated in FIG. 1) sealed in a space between the two substrates 11 and 12. Of the two substrates 11 and 12, the substrate 11, which is disposed in the back, serves as a pixel electrode substrate (array substrate, TFT substrate) 11 including a transparent substrate on which, for example, switching elements (e.g. TFTs) connected to source wires and gate wires that are orthogonal to each other, pixel electrodes connected to the switching elements, an alignment film, and the like are provided. The substrate 12, which is disposed in the front, serves as a counter substrate (CF substrate) 12 including a transparent substrate on which a color filter having colored portions such as R (red) portions, G (green) portions, B (blue) portions, and the like arranged in a predetermined array, a counter electrode, an alignment film, and the like are provided.

In the liquid crystal panel 10 thus configured, a predetermined potential difference generated between a pixel electrode and the counter electrode causes a fringe field (oblique field) including a component normal to plate surfaces of the substrates 11 and 12 to be applied to a liquid crystal layer sealed in the space between the two substrates 11 and 12. Controlling this electric field allows timely switching of states of orientation of liquid crystal molecules contained in the liquid crystal layer.

As shown in FIG. 1, the liquid crystal panel 10 according to the first embodiment has polarizing plates 13 and 14 disposed on outer sides of the two substrates 11 and 12, respectively. The polarizing plates 13 and 14 are a type of optical member, and have a function of selectively transmitting only light that oscillates in a particular direction. The following assumes that that one of the two polarizing plates 13 and 14 that is pasted to a back surface of the pixel electrode substrate 11 is a back side polarizing plate 13 and that one of the two polarizing plates 13 and 14 that is pasted to a front surface of the counter substrate 12 is a front side polarizing plate 14. It should be noted that the liquid crystal panel 10 may alternatively be configured such that a phase difference plate(s) is/are placed in addition to the polarizing plate(s) on the outer side(s) of either or both of the substrates 11 and 12. The phase difference plate(s) too is/are a type of optical member, and has/have a function of imparting a predetermined phase difference to linearly-polarized light having passed through the polarizing plate(s).

Light having entered the liquid crystal layer through the back side polarizing plate 13 propagates in a front-back direction (Z-axis direction) though the liquid crystal layer with a change in polarization state according to the state of orientation of the liquid crystal molecules, and only light that is capable passing through the front side polarizing plate 14 is emitted as display light. As stated previously, changing the state of orientation of the liquid crystal molecules by controlling an electric field that is applied to the liquid crystal layer causes a change in transmittance of light that passes through the liquid crystal panel 10, so that an image is displayed on a front surface (image display surface) of the liquid crystal panel 10.

The first embodiment illustrates, as the polarizing plates 13 and 14, polarizing plates in which iodine molecules (polarizing elements) are aligned in the same orientation direction by drawing polyvinyl alcohol polymers into films after dyeing them with iodine. When such polarizing plates 13 and 14 are irradiated with light, light traveling in the orientation direction of the molecular axes of the iodine molecules is absorbed and only light traveling in an orthogonal direction is transmitted.

[Backlight Device 20]

A configuration of the backlight device 20 is schematically described. As the backlight device 20, too, a backlight device of a well-known configuration can be used without any particular limitation.

As shown in FIG. 1, the first embodiment illustrates a so-called edge-light (side-light) backlight device 20 in which LEDs (light-emitting diodes) 26 serving as light sources are arrayed along a side edge of a light guide plate 23 disposed inside the backlight device 20.

Figure 2:
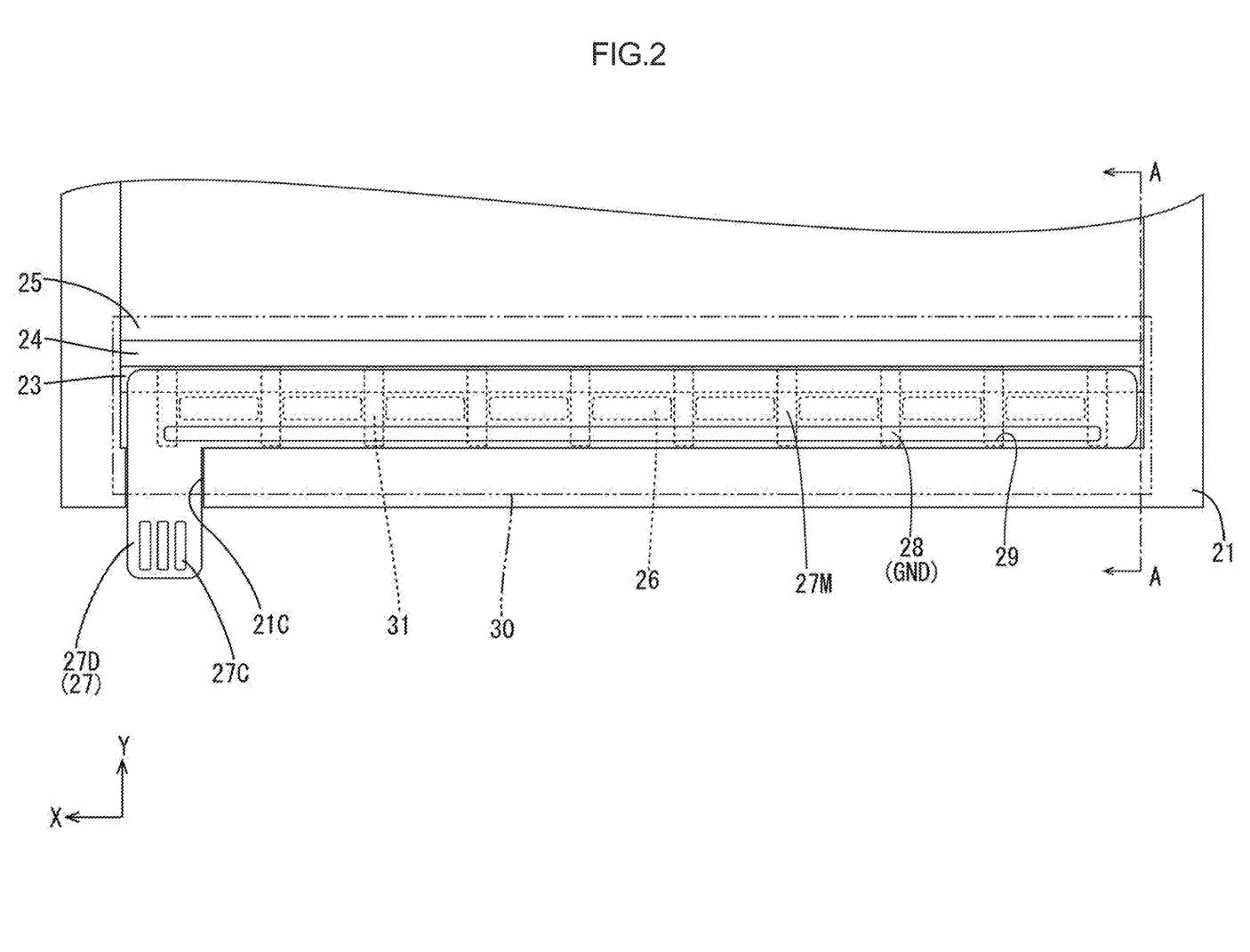
FIG. 2 is a partially enlarged view of an LED-disposed portion of a backlight device as seen from the front.

As shown in FIGS. 1 and 2, the backlight device 20 includes, as a housing, a frame 21 that has an opening facing the front side, i.e. a light exit side (liquid crystal panel 10 side) and that has a predetermined thickness. The frame 21 functions as a support that accommodates the after-mentioned various types of optical member and the like inside and supports them. The frame 21, illustrated in the first embodiment, also has an opening facing the back side and has a rectangular frame shape. Of the four sides of the frame 21 that form the frame shape, a part of a short side extending along the X axis along which the LEDs 26 are arrayed is provided with a notch 21C through which a drawn section 27D of the after-mentioned LED substrate 27 is drawn out.

As the frame 21, an insulating frame made of synthetic resin or the like is used. A usable example of the frame 21 is one obtained by injection molding of polycarbonate resin, acrylonitrile butadiene styrene (ABS) resin, or the like. The color of the frame 21 is preferably, but is not particularly limited to, white from the point of view of enhancing efficiency in the use of light or black from the point of view of preventing light from leaking out.

Figure 3:
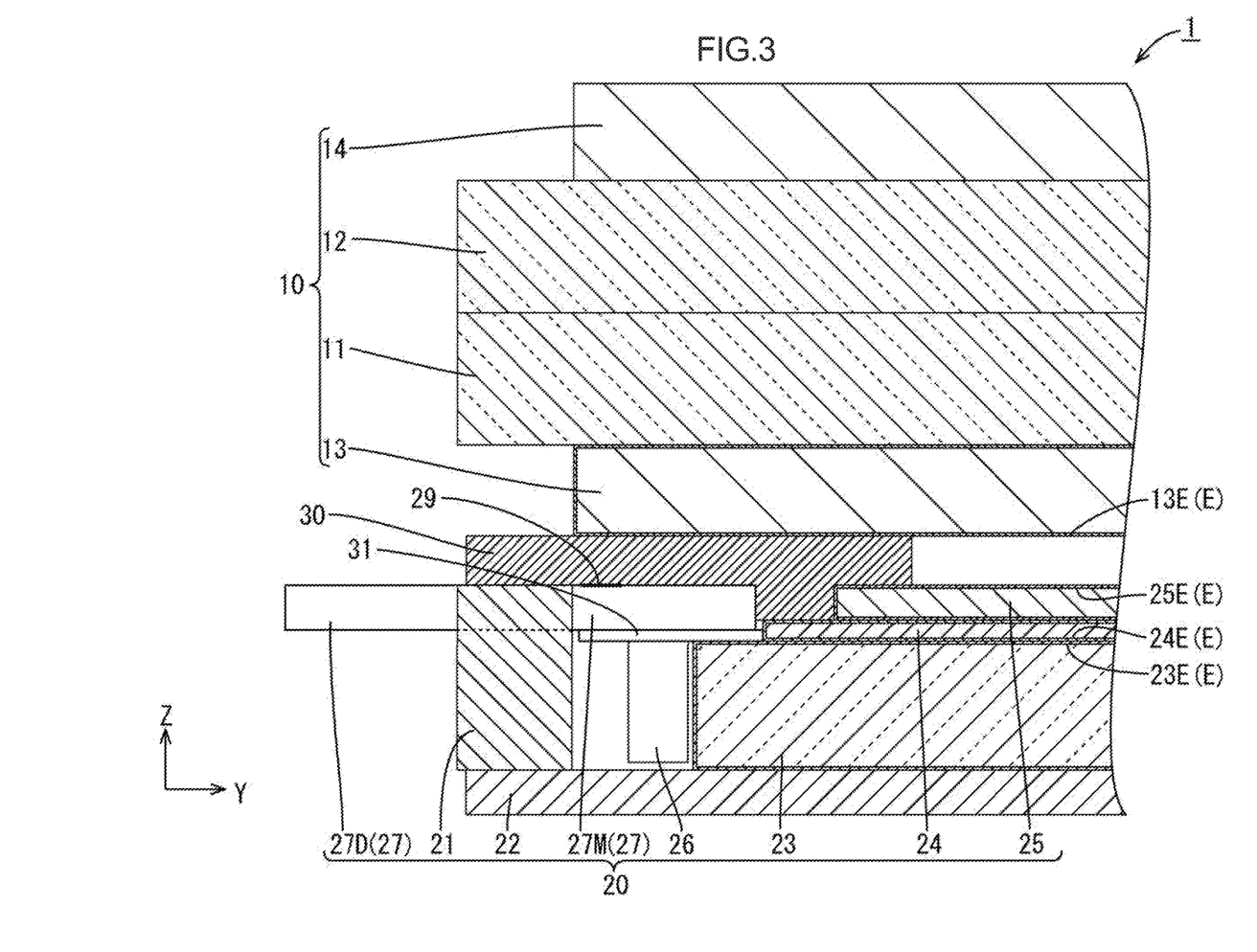
FIG. 3 is a cross-sectional view taken along line A-A of FIG. 2.

As shown in FIGS. 1 and 3, a reflection sheet 22 is disposed on a back side of the frame 21 in such a manner as to cover the opening of the frame 21 from the back side. This reflection sheet 22 is a type of optical sheet, and has a function of reflecting forward light emitted toward the back of the after-mentioned light guide plate 23. The reflection sheet 22 makes it possible to enhance the luminance of the screen by increasing the amount of light that is emitted toward the liquid crystal panel 10. As the reflection sheet 22, an insulating reflection sheet made of synthetic resin or the like is used, as in the case of the frame 21. It is preferable that a front surface of the reflection sheet 22 be white, which is excellent in reflectivity of light.

The light guide plate 23 is disposed on a front side of the reflection sheet 22 in the frame 21. The light guide plate 23 is a type of optical member, and has a function of letting in light emitted from light sources disposed to face one end face extending along an X-axis direction of the light guide plate 23, raising the light toward the light exit side (liquid crystal panel 10 side) while propagating the light through the inside of the light guide plate 23 to guide the light in a direction away from the light sources, and causing the light to exit through the front plate surface in the form of surface light. As the light guide plate 23, a light guide plate made of synthetic resin (e.g. acrylic resin such as PMMA or polycarbonate resin) or the like that is sufficiently higher in refractive index than air and substantially transparent (excellent in translucency) is used. In the first embodiment, a light guide plate made of polycarbonate resin is used.

Optical sheets are stacked on a front side (light exit side) of the light guide plate 23, and are disposed to be interposed between the liquid crystal panel 10 and the light guide plate 23. The optical sheets stacked on the front side of the light guide plate 23 have a function of transmitting light emitted from the light guide plate 23 and, while imparting predetermined optical effects to the transmitted light, causing the transmitted light to exit toward the liquid crystal panel 10. As the optical sheets, optical sheets that bring about various optical effects can be used in combination as appropriate according to the required function. The first embodiment illustrates an example in which a total of two optical sheets, namely a diffusion sheet 24 and a lens sheet 25, are stacked from a light guide plate 23 side.

In the first embodiment, the diffusion sheet 24 is stacked directly on a front surface of the light guide plate 23. The diffusion sheet 24 serves to cause light emitted from the light guide plate 23 and having entered through a back side of the diffusion sheet 24 to exit toward the front side (light exit side, liquid crystal panel 10 side) while diffusing, and has a function of uniforming the amount of light from the light sources. A usable example of the diffusion sheet 24 is one or the like obtained by dispersedly mixing light diffusion particles (filler) composed of silica, aluminum hydroxide, zinc oxide, acrylic resin, polyurethane, polystyrene, or the like into a substantially transparent and highly translucent sheet-like base material composed of acrylic resin, polyurethane, polyester, silicone resin, epoxy resin, or the like. The first embodiment illustrates one obtained by continuously forming, on one surface of a sheet composed of polycarbonate resin formed into the shape of a sheet, a small prism having a refractive surface. In the diffusion sheet 24 according to the first embodiment, light is diffused by surface refraction of the prism formed at the front of the diffusion sheet 24.

In the first embodiment, the lens sheet 25 is stacked on a front surface of the diffusion sheet 24. The lens sheet 25 imparts a light-gathering effect by regulating the direction of light having traveled via the diffusion sheet 24. The first embodiment illustrates, as the lens sheet 25, one configured such that a large number of unit lenses each extending along one direction are arranged side by side along a direction orthogonal to the direction of extension and lens grooves are formed by acrylic resin in a sheet composed of polyester resin. Unlike those according to the second and third embodiments, the lens sheet 25 according to the first embodiment is formed so that the lens sheet 25 is shorter at least in length along the Y-axis direction than the diffusion sheet 24, and is disposed so that the same edge of the diffusion sheet 24 stacked on a back side protrudes from an edge of the lens sheet 25 at which the after-mentioned LEDs 26 are disposed. Although the first embodiment illustrates, as a lens sheet, a configuration in which one lens sheet 25 is used, two lens sheets, namely an upper lens sheet and a lower lens sheet, may alternatively be used in combination.

In a position within the frame 21 that faces an end face extending along the side edge of the light guide plate 23, an LED substrate 27 mounted with the LEDs 26 is accommodated.

The LEDs 26 serves as light sources of light that is projected onto the liquid crystal panel 10. Well-known LEDs such as top-emitting LEDs and side-emitting LEDs can be used for the LEDs 26. The first embodiment illustrates a linear side-by-side arrangement of nine side-emitting LEDs 26 whose light-emitting surfaces are side surfaces that are adjacent to surfaces at which they are mounted on the LED substrate 27.

The LED substrate 27 mounted with the LEDs 26 serves to control the turning on of the LEDs 26 in accordance with an input signal that is inputted from an outside source.

The first embodiment illustrates an LED substrate 27 including a base material, obtained by forming a flexible synthetic resin material made of an insulating material into the shape of a film (sheet), whose plate surface is disposed parallel to the respective plate surfaces of the liquid crystal panel 10, the light guide plate 23, and the like. As shown in FIG. 2, the LED substrate 27 has an outline of a substantially L shape when seen in a plan view, and includes a mounting section 27M, extending along a short side direction (X-axis direction) of the light guide plate 23, on which the LEDs 26 are mounted and a drawn section 27D extending from one end of the mounting section 27 outward (toward a side opposite to the light guide plate 23) along a Y-axis direction. As shown in FIG. 3, the LED substrate 27 is disposed in such a position that its front surface is substantially flush with a front surface of the lens sheet 25 in front of the light guide plate 23 and to the front of the frame 21 in the front-back direction (Z-axis direction).

The mounting section 27M is disposed so that on the inside of the frame 21, a part of the inside (upper side in FIG. 2, right side in FIG. 3) of the mounting section 27M overlaps the front surface of the light guide plate 23, and the nine LEDs 26 are mounted side by side in a row on a back surface of a part of the mounting section 27M that does not overlap the light guide plate 23. The LED substrate 27 is provided with a conductor pattern 28 of wires that constitute signal wires and a ground section GND for controlling the turning on of the LEDs 26. Moreover, in the first embodiment, as shown in FIG. 2, on a front surface of the mounting section 27M, a conducting opening 29 is provided in an insulating base material covering the conductor pattern 28, so that a part of the ground section GND disposed on the LED substrate 27 is exposed.

The drawn section 27D extends from the mounting section 27M, disposed inside the frame 21, toward the outside of the frame 21 through the already-mentioned notch 21 formed in the frame 21. The drawn section 27D has its extension end formed with a connection 27C connected to the conductor pattern 28, and for example, the connection 27C is connected to a main substrate or the like that is connected to an electrode or the like of the liquid crystal panel 10, so that electrical continuity with the outside of the liquid crystal display device 1 is achieved.

The backlight device 20 according to the first embodiment includes a light guide plate fixing tape 31 that fixes the light guide plate 23 to the LED substrate 27. The light guide plate fixing tape 31 has a function of stabilizing a display by defining the relative positions of the LEDs 26 and the light guide plate 23 and allowing light emitted from the LEDs 26 to stably fall on the light guide plate 23. As shown in FIG. 2, the light guide plate fixing tape 31 is disposed in a comb-like shape so as to extend between the intermittently-mounted LEDs 26 on a back surface of the mounting section 27M of the LED substrate 27. As shown in FIG. 3 and the like, the light guide plate fixing tape 31 has its front surface fixedly attached to a back surface of the LED substrate 27 and its back surface fixedly attached to the front surface of the light guide plate 23. The light guide plate fixing tape 31 used may be one, selected as appropriate from among already-known two-sided adhesive tapes each having adhesive layers formed on both sides thereof, that is excellent in adhesion to the resin constituting the base material of the LED substrate 27 and the light guide plate 23, thermal resistance to heat generated by the LEDs 26, and the like. Further, from the point of view of achieving a slimming down of the backlight device 20 of sheets and glass, it is preferable that the light guide plate fixing tape 31 used be comparatively thin.

[Liquid Crystal Panel Fixing Tape 30]

The liquid crystal panel 10 and the backlight device 20, both configured to include members such as those described above, are fixed to each other by a liquid crystal panel fixing tape (an example of a fixing member) 30. In the first embodiment, the liquid crystal panel fixing tape 30 is pasted all around the outer edge of the back side polarizing plate 13, which has a substantially rectangular shape in a plan view, and the frame 21, which has a rectangular frame shape. As a result, as shown in FIG. 1 and the like, a back surface of the back side polarizing plate 13 and the front surface of the lens sheet 25 are disposed opposite each other while forming a clearance that corresponds to the thickness of the liquid crystal panel fixing tape 30. The liquid crystal panel fixing tape 30 used is a two-sided adhesive tape having adhesive layers formed on both sides thereof and, in the technology described herein, further has electrical conductivity.

As the liquid crystal panel fixing tape 30, any of various already-known conductive two-sided adhesive tapes can be used without any particular restriction. Examples of conductive two-sided adhesive tapes include one obtained by coating, with conductive layers, the surfaces of a common two-sided adhesive tape having adhesive layers and one having adhesive layers obtained by dispersing a conducting substance in adhesive resin.

Examples of the adhesive resin include acrylic resin, silicone resin, urethane resin, rubber resin, vinyl alkyl ether resin, polyester resin, polyamide resin, fluorine resin, epoxy resin, and the like, and from the point of view of adhesion adjustment, dispersibility of the conducting substance, and the like, it is preferable that the adhesive resin be acrylic resin.

Usable examples of the conducting substance that is dispersed in the conductive layers and the adhesive resin include, in addition to those mentioned below as a conducting substance contained in a conductive layer E formed on a surface of each optical member, particles (powders) of conducting materials such as metals such as nickel, iron, chromium, cobalt, aluminum, antimony, molybdenum, copper, silver, platinum, and gold, alloys such as solder and stainless steel, metal oxides, and carbon such as carbon black, metal-coated particles obtained by coating surfaces of particles such as polymer particles, glass particles, and ceramic particles with a metal, ones obtained by coating surfaces of particles of a metal with another metal, and the like.

The liquid crystal panel fixing tape 30 may be a so-called base-material-free conductive two-sided adhesive tape not including a base material, or may be a so-called base-material-containing conductive two-sided adhesive tape including the base material. Further, in the case of a base-material-containing conductive two-sided adhesive tape, it is preferable that it include a foam base material, e.g. a conductive foam base material composed of a foam resin sheet and a conducting substance added to the foam resin sheet. By including the foam base material, the liquid crystal panel fixing tape 30 can favorably adhere to an adherend surface in conformance with the adherend surface even in a case where the adherend surface has a stepped shape. This is advantageous in terms of retaining the structure and securing electrical continuity.

In the first embodiment, the liquid crystal panel fixing tape 30 used has conducting adhesive layers on both sides of an elastically-deformable conductive foam base material.

[Antistatic Structure]

Next, a structure for prevention of the build-up of electricity on the back side polarizing plate 13, the lens sheet 25, the diffusion sheet 24, and the light guide plate 23, which are optical members, in such a liquid crystal display device 1 according to the first embodiment is described mainly with reference to FIGS. 2 and 3.

As shown in FIG. 3, the back side polarizing plate 13, the light guide plate 23, the diffusion sheet 24, and the lens sheet 25 have conductive layers (examples of conductive sections) provided on their respective surfaces. The conductive layers provided on the optical members, respectively, are hereinafter collectively referred to as "conductive layers E", and in a case where it is necessary to distinguish between the conductive layers E provided on the optical members, respectively, a suffix "E" is added to the sign of each of the members.

Each of the conductive layer E needs only be one that is capable of conducting electricity built up on the surface of a corresponding one of the optical members, and may for example be of an already-known configuration such as an antistatic layer described in Japanese Unexamined Patent Application Publication No. 2014-160246. From the point of view of preventing the build-up of electricity, it is preferable that the conductive layer E be formed to have a surface resistance of $10^{12}\Omega/\square$ or lower, preferably $10^{11}\Omega/\square$ or lower.

The first embodiment illustrates a configuration in which each of the conductive layers E is provided thinly and solidly over the whole surface of a corresponding one of the optical members.

It is preferable that each of the conductive layers E have high electrical conductivity and high transparency so as not to lower the transmittance of light that passes through a corresponding one of the optical members. For example, each of the conductive layers E may be a layer obtained by dispersing a conducting substance in a highly transparent binder resin.

It is preferable that the binder resin be excellent in adhesiveness to a corresponding one of the optical members, compatibility with the conducting substance, transparency, and durability. Usable examples of the binder resin include acrylic resin, epoxy resin, urethane resin, phenol resin, polyester resin, and the like. Among them, acrylic resin is preferred. From the point of view of durability of the conductive layer E, workability in the process of forming the conductive layer E, and the like, it is preferable that the binder resin be photo-curable. For example, the conductive layer E can be formed with a resin composition containing a multifunctional monomer or oligomer and a photopolymerization initiator.

It is possible to use, as the conducting substance contained in the conductive layer E, a metal, a metal oxide, or an alloy substance such as ITO (indium tin oxide), AZO (aluminum-doped zinc oxide), ATO (aluminum-doped tin oxide), $SnO$, $RuO_2$, $IrO_2$, gold, silver, nickel, copper, or palladium or a conducting polymer such as polyaniline, polyacetylene, polypyrrole, polythiophene, polyparaphenylene, polydienylene, polyphenylene vinylene, polyphenylene sulfide, or polysulfur nitride. Alternatively, it is possible to use a conducting substance having a shell formed by evaporation of the aforementioned metal, metal oxide, or alloy substance on a surface of a core constituted by a polymer and the like. It is possible to use a combination of one or more conducting substances selected from among the aforementioned conducting substances.

In the first embodiment, a fixing member for fixing an optical member to another member is fixedly attached to a portion of a corresponding one of the conductive layers E that is provided at the outer edge of the optical member. Through each of the conductive layers E thus formed, electricity built up on a corresponding one of the optical members is easily conducted from the whole surface of the optical member to the outer edge.

The first embodiment illustrates a configuration in which the already-described liquid crystal panel fixing tape 30, which fixes the liquid crystal panel 10 to the backlight device 20, serves as a fixing member.

As shown in close-up in FIG. 3, a front surface of the liquid crystal panel fixing tape 30 is pasted so that at least a part of the front surface makes contact with a part of the conductive layer 13E of the back side polarizing plate 13 and extends around the outer edge of the back side polarizing plate 13.

A back surface of the liquid crystal panel fixing tape 30 is fixedly attached to the conductive layer 25E of the lens sheet 25 and the frame 21. At the side edge (left side edge in FIG. 1) of the backlight device 20 at which the LEDs 26 are disposed, the back surface of the liquid crystal panel fixing tape 30 is also fixedly attached to the diffusion sheet 24 and the LED substrate 27 in addition to the conductive layer 25E of the lens sheet 25 and the frame 21. Particularly, as shown in FIG. 3, the innermost region (right side in FIG. 3), a region adjacent thereto, a further outer region, and the outermost region of the back surface of the liquid crystal panel fixing tape 30 are fixedly attached to the conductive layer 25E of the lens sheet 25, the conductive layer 24E of the diffusion sheet 24, the mounting section 27M of the LED substrate 27, and the frame 21, respectively. By including an elastically-deformable conductive foam base material, the liquid crystal panel fixing tape 30 is securely fixedly attached to each member while deforming in conformance with the difference in level between the lens sheet 25 and the diffusion sheet 24 and the like.

Note here that, as already described, on the front surface of the mounting section 27M of the LED substrate 27, the conducting opening 29 is formed in an outer region than the mounting positions of the LEDs 26 so as to expose a part of the ground section GND of the conductor pattern 28 disposed in the LED substrate 27, and the liquid crystal panel fixing tape 30 is fixedly attached to cover the conducting opening 29 and touch the ground section GND. The ground section GND is one formed as a ground of a circuit for controlling the turning on of the LEDs 26, and is formed so as to be able to conduct electricity out of the liquid crystal display device 1 through the connection 27C of the LED substrate 27. Note also here that by including an elastically-deformable conductive foam base material, the liquid crystal panel fixing tape 30 is securely fixedly attached to the ground section GND while deforming in conformance with the difference in level between a front surface of the LED substrate 27 and a front surface of the conductor pattern 28 exposed at the conducting opening 29. Since the liquid crystal panel fixing tape 30 is thus fixedly attached to the ground section GND, the ground section GND and each of the optical members (namely the back side polarizing plate 13, the lens sheet 25, and the diffusion sheet 24) fixedly attached to the liquid crystal panel fixing tape 30 are electrically connected to each other.

Moreover, as shown in FIG. 3, by the diffusion sheet 24 making contact with the light guide plate 23 under its own weight, the conductive layer 24E formed on the back surface of the diffusion sheet 24 and the conductive layer 23E formed on the front surface of the light guide plate 23 are brought into contact to be electrically connected to each other. As a result, the light guide plate 23 is electrically connected to the liquid crystal panel fixing tape 30, and by extension to the ground section GND, via the conductive layer 24E.

Working Effects of the First Embodiment

A liquid crystal display device (display device) according to the first embodiment is configured as described in [1] to [6] below.

[1] A liquid crystal display device (display device) 1 including:

a liquid crystal panel 10 that is capable of displaying an image;

one or more optical members 13, 23, 24, and 25 that impart predetermined optical effects to light emitted toward the liquid crystal panel 10;

a liquid crystal panel fixing tape 30, i.e. one or more fixing members, fixing the optical members 13 and 25 to a frame 21, i.e. another member; and an LED substrate 27, i.e. a control substrate, that exercises control associated with a display of an image, wherein the LED substrate 27 has a ground section GND formed by a conductor pattern 28, and the liquid crystal panel fixing tape 30 has electrical conductivity and electrically connects the optical members 13, 23, 24, and 25 directly or indirectly to the ground section GND.

According to the foregoing configuration of the first embodiment, the optical members 13, 23, 24, and 25 of the liquid crystal panel (display panel) 10 are electrically connected to the ground section GND formed by the conductor pattern 28 of the LED substrate (control substrate) 27. This makes it possible to dissipate electricity built up on the optical members 13, 23, 24, and 25 out of the liquid crystal display device (display device) 1 through the ground section GND and prevent the decline in display quality due to the build-up of electricity on the optical members 13, 23, 24, and 25. Since the existing ground section GND of the LED substrate 27 is used to dissipate electricity out of the liquid crystal display device 1, it is not necessary to newly provide a dedicated ground wire. This makes it possible to prevent the liquid crystal display device 1 from becoming complex in configuration due to an antistatic structure of an optical member and makes it unnecessary to reserve a new wiring space. Further, by using the liquid crystal panel fixing tape (fixing member) 30, which serves to fix the optical members 13, 24, and 25, to electrically connect the optical members 13, 23, 24, and 25 to the ground section GND, an antistatic structure can be formed without the need for a new dedicated member. This makes it possible to prevent an increase in the number of components that constitute the liquid crystal display device 1.

[2] In the liquid crystal display device (display device) 1 of [1], at least one of the optical members 13, 23, 24, and 25 is provided with a conductive layer (conductive section) 13E, 23E, 24E, or 25E that conducts electricity built up on the optical member 13, 23, 24, or 25, and the liquid crystal panel fixing tape 30, i.e. at least one of the fixing members, is fixedly attached to the conductive layers 13E, 24E, and 25E of the optical members 13, 24, and 25.

According to the foregoing configuration of the first embodiment, the conductive layers (conductive sections) E provided all over the surfaces of the optical members 13, 23, 24, and 25, respectively, are electrically connected to the ground section GND of the LED substrate 27 via the liquid crystal panel fixing tape 30, whereby electricity build up over the whole area of each optical member can be effectively dissipated out of the liquid crystal display device 1.

[3] In the liquid crystal display device 1 of [1] or [2], the liquid crystal panel 10 is a liquid crystal panel 10 including two substrates 11 and 12 and a liquid crystal layer sealed in a space between the two substrates 11 and 12, the liquid crystal display device 1 further including a backlight device 20, i.e. a lighting device, disposed on a rear side (back side) of the liquid crystal panel 10 opposite to an image display surface of the liquid crystal panel 10 on which an image is displayed, that illuminates the liquid crystal panel 10 with light, the backlight device 20 is provided with an LED 26, i.e. a light source, and an LED substrate 27, i.e. a light source substrate, that controls driving of the LED 26, and the control substrate is the light source substrate.

According to the foregoing configuration of the first embodiment, the build-up of electricity on the optical members 13, 23, 24, and 25 can be prevented by using, the light source substrate (LED substrate 27), which is a member essential to the backlight device (lighting device) 20, in the liquid crystal display device 1, which is heavily used as a display device. Since the LED substrate 27 is usually disposed in proximity to the back side polarizing plate (optical member) 13 stacked on the rear side of the liquid crystal panel 10 and a large number of optical members 23, 24, and 25 disposed in the backlight device 20, a path of conduction from the optical members 13, 23, 24, and 25 to the ground section GND can be shortened. This is also preferable from the point of view of preventing the manufacturing process from becoming complex.

[4] In the liquid crystal display device 1 of [3], at least one of the optical member is a back side polarizing plate 13, i.e. a polarizing plate, stacked on the rear side of the liquid crystal panel 10, and the liquid crystal panel fixing tape 30, i.e. at least one of the fixing members, is fixedly attached to the back side polarizing plate 13 to fix the liquid crystal panel 10 to the backlight device 20.

The liquid crystal display device 1 includes the liquid crystal panel fixing tape (fixing member) 30, which fixes the liquid crystal panel 10 to the backlight device 20, and the liquid crystal panel fixing member 30 is fixedly attached to the back side polarizing plate (polarizing plate) 13 stacked on the rear side of the liquid crystal panel 10 and, for example, the frame 21, which is a housing of the backlight device 20, to fix the back side polarizing plate 13 to the frame 21. According to the foregoing configuration of the first embodiment, by using this existing liquid crystal panel fixing tape 30 to connect an optical member to the ground section GND, the build-up of electricity on the optical member is prevented without an increase in the number of components of the liquid crystal display device 1. This makes it possible to reduce the occurrence of a Newton ring in the liquid crystal display device 1.

[5] In the liquid crystal display device 1 of [4], the liquid crystal panel 10 is divided into a display region in which an image is displayed and a non-display region that surrounds the display region, and the liquid crystal panel fixing tape 30 fixing the liquid crystal panel 10 to the backlight device 20 has a light blocking effect and is fixedly attached all around an outer edge of the back side polarizing plate 13 that overlaps the non-display region of the liquid crystal panel 10.

According to the foregoing configuration of the first embodiment, the liquid crystal panel fixing tape (fixing member) 30 is fixedly attached all over the outer edge of the back side polarizing plate 13 to fix the liquid crystal panel 10 to the backlight device 20, and has a function of preventing light from entering and leaving the non-display region of the liquid crystal panel 10. By making such a liquid crystal panel fixing tape 30 conductive and using it in preventing the build-up of electricity, electricity built up on the polarizing plate 13 can be derived from all around the edge of the polarizing plate 13 via the liquid crystal panel fixing tape 30. This makes it possible to more effectively prevent the build-up of electricity. By fixedly attaching the liquid crystal panel fixing tape 30 to the frame 21 of the backlight device 20 while fixedly attaching the liquid crystal panel fixing tape 30 all over the outer edge of the polarizing plate 13 of the liquid crystal panel 10, the liquid crystal panel 10 (back side polarizing plate 13) is securely fixed to the backlight device 20 while an image is displayed with higher contrast and, furthermore, the build-up of electricity on the back side polarizing plate 13 is effectively prevented.

[6] In the liquid crystal display device 1 of any of [3] to [5], at least one of the optical members is one or more optical members 23, 24, and 25 disposed in the backlight device 20, and the liquid crystal panel fixing tape 30, i.e. at least one of the fixing members, is fixedly attached to the optical members 24 and 25 disposed in the backlight device 20.

In the backlight device 20, a plurality of optical members such as the lens sheet 25, the diffusion sheet 24, and the light guide plate 23 are disposed. According to the foregoing configuration of the first embodiment, by electrically connecting such optical members 23, 24, and 25 to the ground section GND of the LED substrate 27, the occurrence of a Newton ring can be reduced by preventing the build-up of electricity on the optical members 23, 24, and 25. The first embodiment is configured such that the optical sheets 24 and 25 disposed in the backlight device 20 are fixedly attached to the liquid crystal panel fixing tape 30 fixing the back side polarizing plate 13 of the liquid crystal panel 10 to the backlight device 20. This makes it possible to simultaneously prevent the build-up of electricity on the back side polarizing plate 13 of the liquid crystal panel 10 and the optical members 24 and 25 of the backlight device 20 with one fixing member (liquid crystal panel fixing tape 30). Furthermore, this also makes it possible to prevent the build-up of electricity on the light guide plate 23, which is electrically connected to the diffusion sheet 24, by indirectly dissipating electricity built up on the light guide plate 23 out of the liquid crystal display device 1.

Modification of the First Embodiment

A modification of the first embodiment is described with reference to FIG. 4. A liquid crystal display device 101 according to the present modification differs from the liquid crystal display device 1 according to the first embodiment, for example, in that in addition to a liquid crystal panel fixing tape 130 that fixes the liquid crystal panel 10 to the frame 21 of a backlight device 120, a diffusion sheet fixing tape 131 that fixes the diffusion sheet 24 to the liquid crystal panel fixing tape 130 is provided as a fixing member and that a depression 123C is formed in a central part of a light guide plate 123. In the following description of the present modification, components which are similar to those of the first embodiment are given the same signs and omitted from the description.

Figure 4:
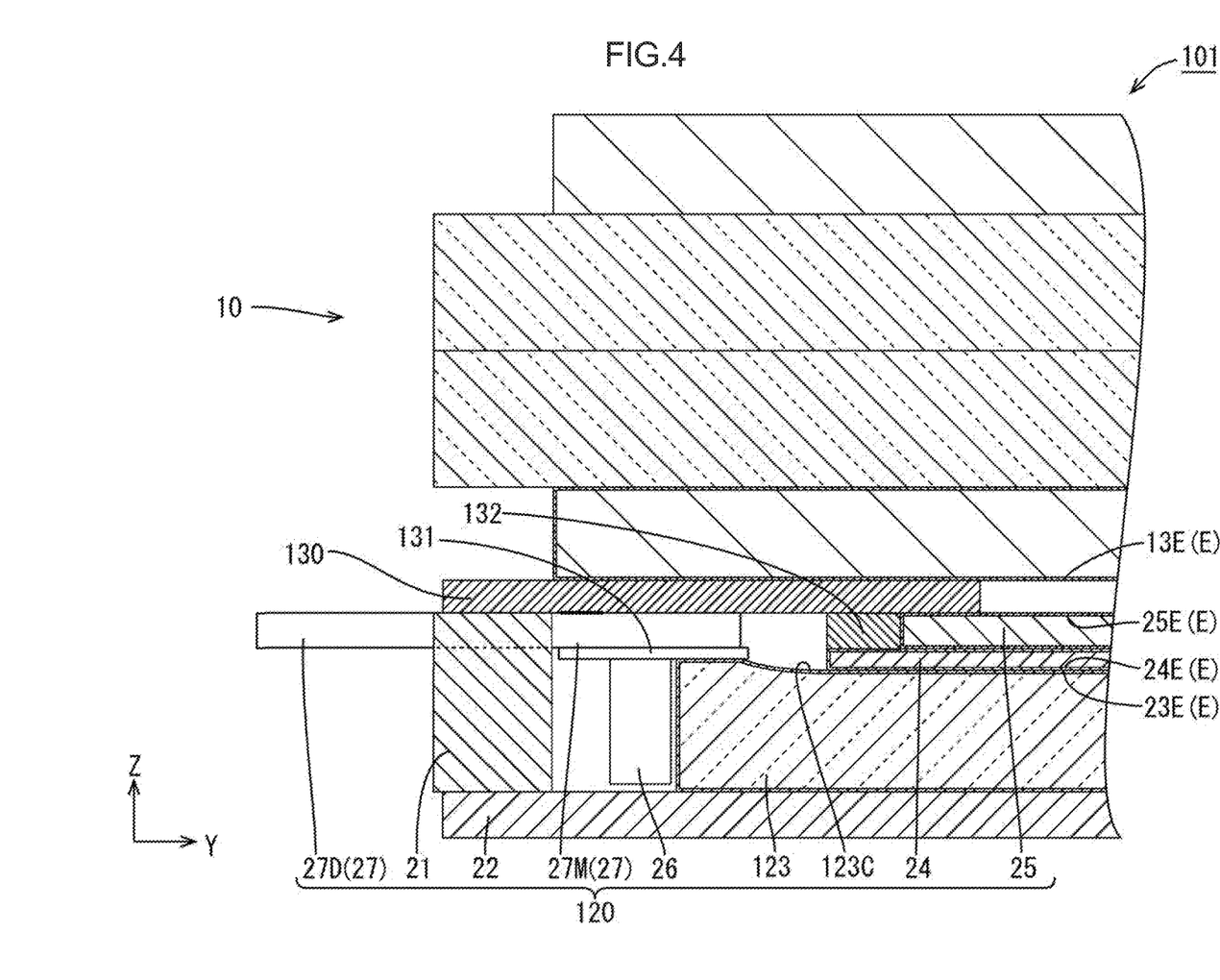
FIG. 4 is a partially enlarged cross-sectional view of a liquid crystal display device according to a modification of the first embodiment.

In a central part of a front surface of the light guide plate 123 according to the present modification, as shown in FIG. 4, the depression 123C is formed so that the thickness of the central part of the light guide plate 123 as seen in a plan view is thinner than the thickness of an end of the light guide plate 123 (i.e. the height of an end face of the light guide plate 123 that faces the LEDs 26). The front surface of the light guide plate 123 at the end and the front surface of the central part located closer to a back side than the end are connected by a curved surface formed near an edge of the front surface. It is preferable, from the point of view of ensuring uniformity of emitted light, that the front surface of the central part constituting a bottom surface of the depression 123C be a flat surface that is parallel to a back surface of the light guide plate 123. The diffusion sheet 24 and the lens sheet 25 are mounted inside the depression 123C thus formed, preferably on the bottom surface formed as a flat surface.

Further, the liquid crystal panel fixing tape 130 according to the present modification serves to fix the liquid crystal panel 10 to the frame 21 of the backlight device 120, and has its back surface fixedly attached to the LED substrate 27 and the lens sheet 25. The liquid crystal panel fixing tape 130 used is thinner than the liquid crystal panel fixing tape 30 according to the first embodiment. Accordingly, since it is difficult to bring the liquid crystal panel fixing tape 130 into close contact with the lens sheet 25 and the diffusion sheet 24 in conformance with the difference in level formed by the two members, a diffusion sheet fixing tape 132 is separately disposed to fill the difference in level. The liquid crystal panel fixing tape 130 and the diffusion sheet fixing tape 132 used are both two-sided adhesive tapes each having adhesive layers formed on both sides thereof and having electrical conductivity.

Working Effects Brought about by Modification of the First Embodiment

The present modification makes it possible to obtain a thin liquid crystal display device 101 in which the build-up of electricity is prevented by a simple configuration.

That is, the backlight device 120 can be made thinner by the difference in level of the depression 123C by forming the depression 123C in the light guide plate 123 and disposing the optical sheets 24 and 25 so that at least a part of each of the optical sheets 24 and 25 is located within the depression 123C. Furthermore, by using a thin two-sided conductive tape as the liquid crystal panel fixing tape 130, the thickness required to fix the liquid crystal panel 10 to the backlight device 120 can reduced, so that a slimming down of the liquid crystal display device 101 as a whole is achieved. As the liquid crystal panel fixing tape 130 has been made thinner, the present modification is configured such that the diffusion sheet fixing tape 132 is disposed to cause all of the optical sheets, namely the lens sheet 25 and the diffusion sheet 24, to be fixedly attached to a conductive tape, and configured such that the build-up of electricity is effectively prevented. It should be noted that not all of the optical sheets need to be fixedly attached to a conductive tape, but a configuration may be set up such that a path of conduction is formed by bringing the conductive layers E formed on the respective optical sheets into contact with each other.

The configuration of the present modification is suitably applied to smartphones and the like whose slimming down is particularly required.

Second Embodiment

A second embodiment is described with reference to FIGS. 5 and 6. A liquid crystal display device 201 according to the second embodiment differs from the liquid crystal display device 1 according to the first embodiment in that in addition to the liquid crystal panel fixing tape 30 described in the first embodiment, a conducting two-sided adhesive tape is used as a light guide plate fixing tape (an example of a fixing member) 231 that fixes a light guide plate to an LED substrate. As with the light guide plate fixing tape 31 according to the first embodiment, the light guide plate fixing tape 231 is fixedly attached to the front surface of the light guide plate 23 and the back surfaces of the diffusion sheet 24 and an LED substrate 227. In the second embodiment, components which are similar to those of the first embodiment are given the same signs and, as such, are not described below (the same applies to the third embodiment).

As the light guide plate fixing tape 231 according to the second embodiment, a conductive two-sided adhesive tape having electrical conductivity can be used, as with the liquid crystal panel fixing tape 30. The second embodiment uses, as the light guide plate fixing tape 231, a flexible conductive two-sided adhesive tape formed to be thinner than the liquid crystal panel fixing tape 30.

Figure 5:
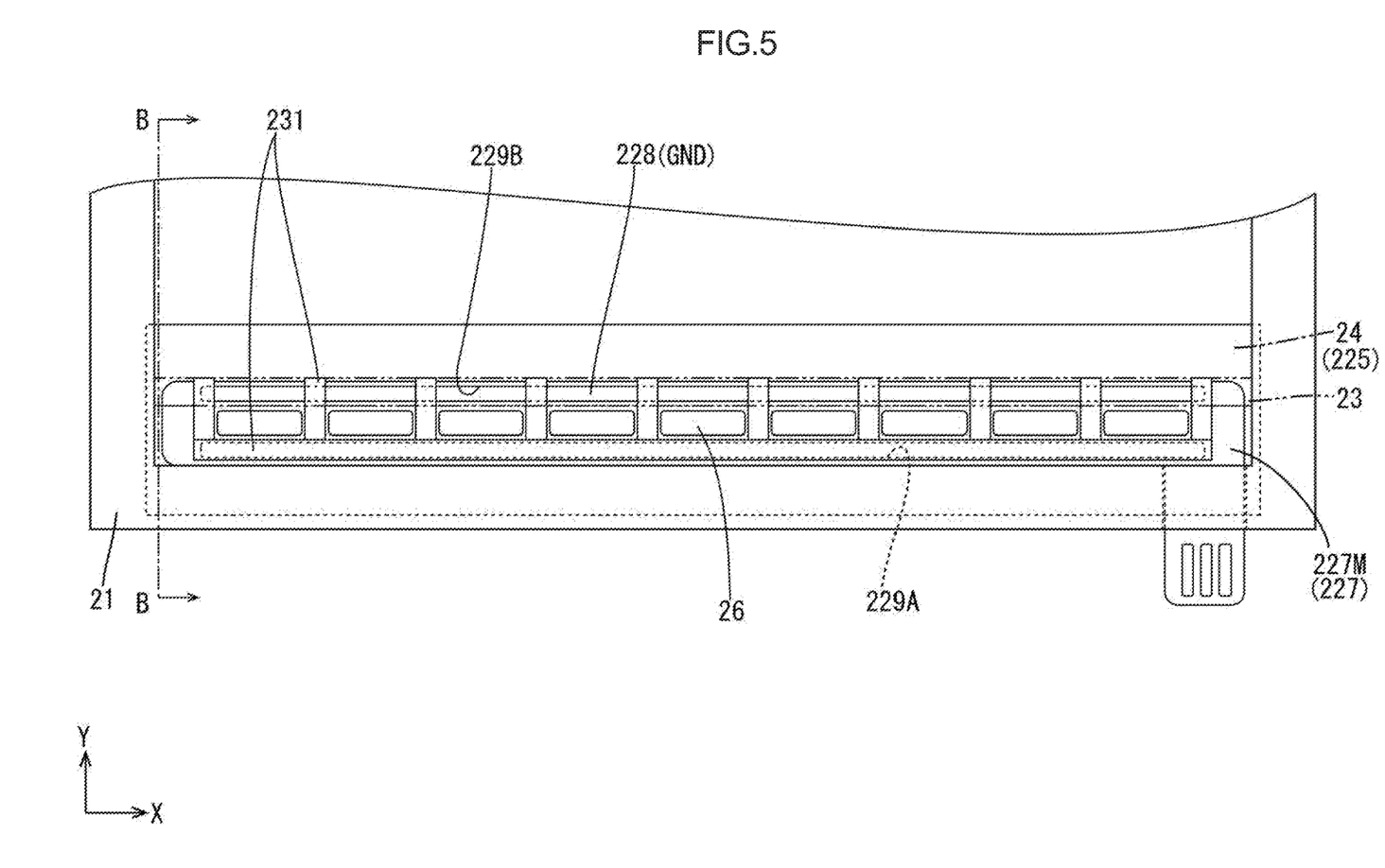
FIG. 5 is a partially enlarged view of an LED-disposed portion of a backlight device according to a second embodiment as seen from the back (excluding a reflection sheet, a light guide plate, a diffusion sheet, and a lens sheet for convenience).

In the LED substrate 227 according to the second embodiment, as shown in FIG. 5, on a back surface of a mounting section 227M, too, a back side conducting opening 229B is provided in an insulating base material covering the conductor pattern 28 formed on the LED substrate 227. It should be noted that FIG. 5 shows a plane configuration as seen from the back side with removal of the reflection sheet 22, the light guide plate 23, the diffusion sheet 24, and a lens sheet 225 from a backlight device 220. From the back side conducting opening 229B, a part of a conductor pattern 228 disposed on the LED substrate 227 that constitutes the ground section GND is exposed. It should be noted that, as shown in FIG. 5 and the like, a conducing opening 229A which is similar to that of the first embodiment is provided in a front surface of the mounting section 227M, too, so that another part of the conductor pattern 228 that constitutes the ground section GND is exposed.

Figure 6:
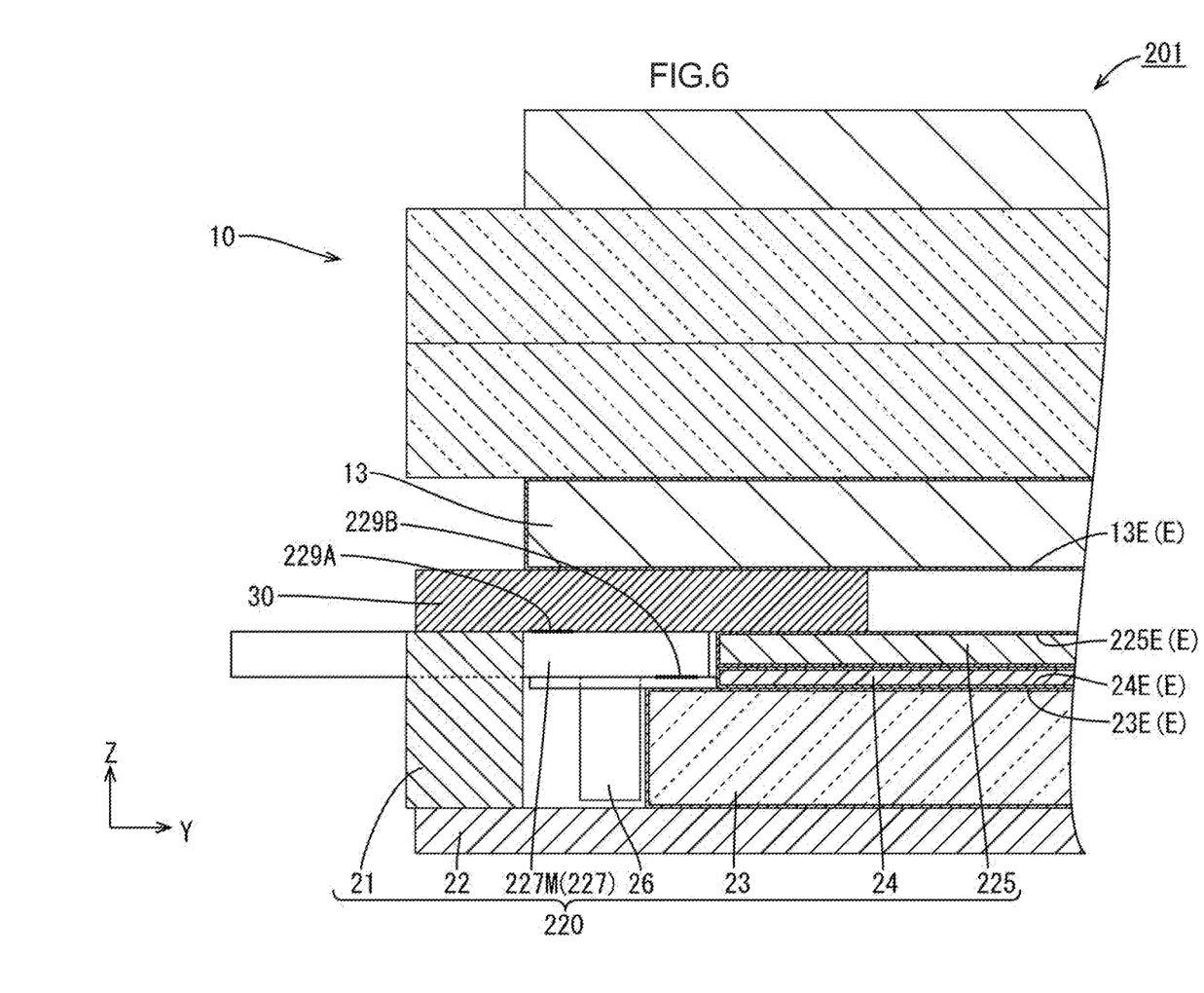
FIG. 6 is a cross-sectional view taken along line B-B of FIG. 5.

In the liquid crystal display device 201 according to the second embodiment, as shown in FIG. 6, the liquid crystal panel 10 is fixed to the backlight device 220 by the liquid crystal panel fixing tape 30, as in the liquid crystal display device 1 according to the first embodiment.

As in the case of the first embodiment, the front surface of the liquid crystal panel fixing tape 30 is fixedly attached so as to make contact with the conductive layer 13E of the back side polarizing plate 13. Meanwhile, the back surface of the liquid crystal panel fixing tape 30 is fixedly attached to a conductive layer 225E of the lens sheet 225 and the frame 21. At the side edge (left side edge in FIG. 5) of the backlight device 220 at which the LEDs 26 are disposed, as shown in FIG. 6, the back surface of the liquid crystal panel fixing tape 30 is also fixedly attached to the front surface of the mounting section 227M of the LED substrate 227 in addition to the conductive layer 225E of the lens sheet 225 and the frame 21. It should be noted that the lens sheet 225 according to the second embodiment has substantially the same size as the diffusion sheet 24. On the front surface of the mounting section 227M, the liquid crystal panel fixing tape 30 is fixedly attached so as to cover the conducting opening 29 and make contact with an exposed part of the ground section GND. As a result, the lens sheet 225 and the back side polarizing plate 13 are electrically connected to the ground section GND of the LED substrate 227 via the liquid crystal panel fixing tape 30.

In the liquid crystal display device 201 according to the second embodiment, furthermore, the light guide plate 23 and the diffusion sheet 24 are electrically connected to the ground section GND of the LED substrate 227 via the light guide plate fixing tape 231. A back surface of the light guide plate fixing tape 231 is fixedly attached so as to make contact with the conductive layer 23E of the light guide plate 23 in a state where an end face of the light guide plate fixing tape 231 is in contact with the conductive layer 24E of the diffusion sheet 24. Meanwhile, a front surface of the light guide plate fixing tape 231 is fixedly attached to a back surface of the mounting section 227M of the LED substrate 227. On the back surface of the mounting section 227M, the light guide plate fixing tape 231 is fixedly attached so as to make contact with a part of the ground section GND exposed from the back side conducting opening 229. As a result, the light guide plate 23 and the diffusion sheet 24 are electrically connected to the ground section GND of the LED substrate 227 via the light guide plate fixing tape 231.

Working Effects of the Second Embodiment

As noted above, unlike the first embodiment, the second embodiment is configured as described in [7] below.

In the configuration of [6] described in the first embodiment, the backlight device 220, i.e. the lighting device, is provided with a light guide plate 23 that receives light from the LED 26 and emits the light as surface light toward the liquid crystal panel 10, at least one of the optical members is the light guide plate 23, and the light guide plate fixing tape 231, i.e. at least one of the fixing members, is fixedly attached to the light guide plate 23 and the LED substrate 227, i.e. the light source substrate, to fix the light guide plate 23 to the LED substrate 227.

The backlight device (lighting device) 220 includes the light guide plate 23, and the LED substrate (light source substrate) 227 and the light guide plate 23 are fixed to each other with use of the light guide plate fixing tape (fixing member) 231 in order to regulate the relative positions of the LED (light source) 26 and the light guide plate 23 for stable emission of light from the light guide plate 23. According to the foregoing configuration of the second embodiment, the stabilization of light that falls on the light guide plate 23 leads to stable display quality, and the build-up of electricity on the light guide plate 23 and the diffusion sheet 24 disposed adjacent thereto is effectively prevented by imparting electrical conductivity to the light guide plate fixing tape 231 and using it to prevent the build-up of electricity.

In the second embodiment, one liquid crystal display device 201 includes fixing members 30 and 231 such as the liquid crystal panel fixing tape 30, which fixes the polarizing plate 13 of the liquid crystal panel 10 and the optical member 225 of the backlight device 220 to the frame 21 of the backlight device 220, and the light guide plate fixing tape 231, which fixes the light guide plate 23 and the diffusion sheet 24 of the backlight device 220 to the LED substrate 227. With this, electricity built up on the optical members 13, 23, 24, and 225 of the liquid crystal display device 201 can be more effectively dissipated out of the liquid crystal display device 201.

Third Embodiment

A third embodiment is described with reference to FIGS. 7 and 8. A liquid crystal display device 301 according to the third embodiment differs from the liquid crystal display device 1 according to the first embodiment in that an LED substrate 327 is disposed closer to the back side than the light guide plate 23 and the LEDs 26 are mounted on a front surface of a mounting section 327M and that a light guide plate fixing tape (an example of a fixing member) 331 that fixes the light guide plate 23 to the LED substrate 327 is provided.

Figure 8:
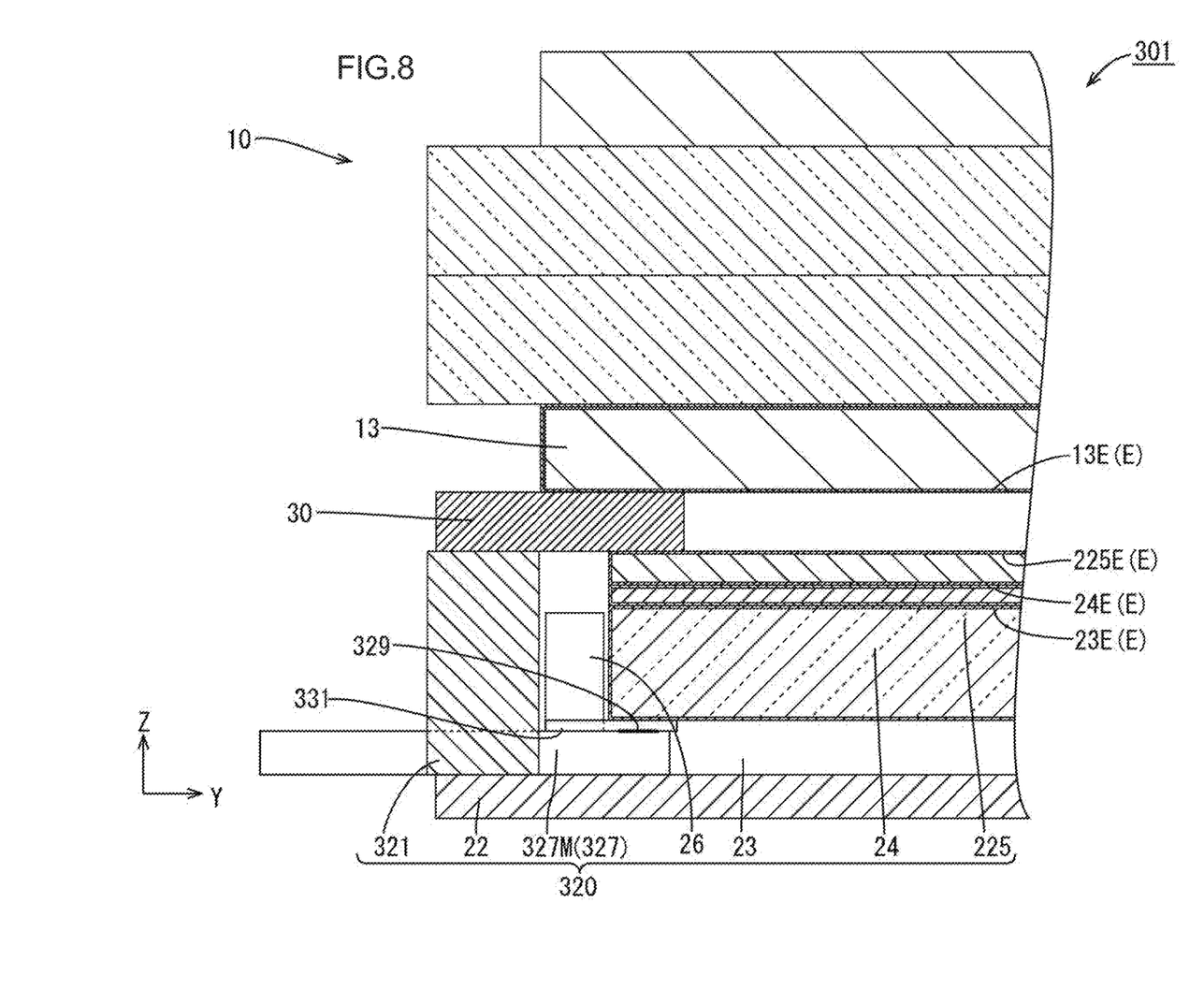
FIG. 8 is a cross-sectional view taken along line C-C of FIG. 7.

In the backlight device 320 according to the third embodiment, as shown in FIG. 8, the mounting section 327M of the LED substrate 327 is disposed to be located between the light guide plate 23 and the reflection sheet 22 in the front-back direction (Z-axis direction). Such an arrangement makes it possible to reduce a region that is blocked by the LED substrate 327 or the like in an opening in a front side (light exit side) of a backlight device 302 through which light is emitted. This is advantageous in terms of achieving a narrower frame.

Figure 7:
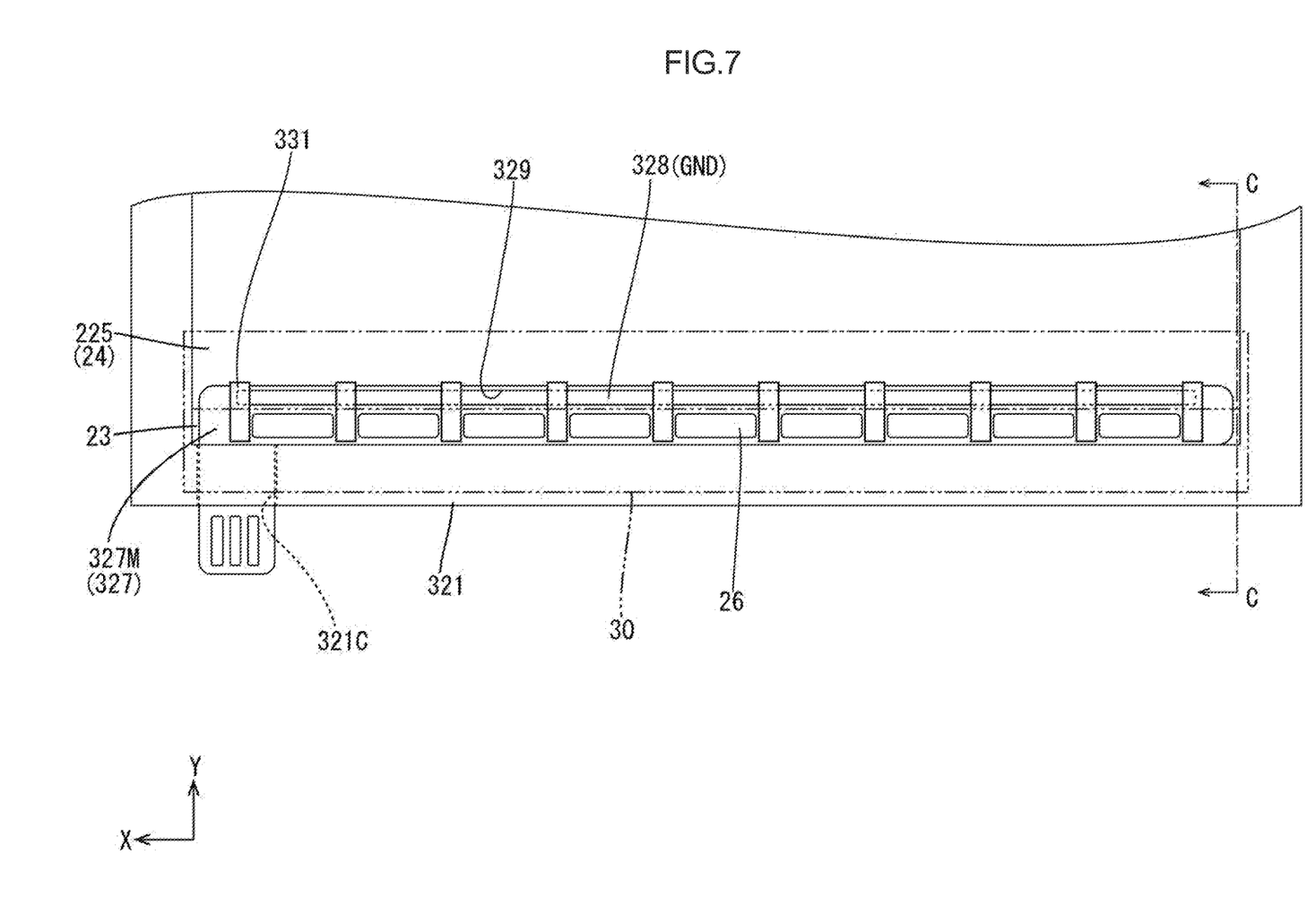
FIG. 7 is a partially enlarged view of an LED-disposed portion of a backlight device according to a third embodiment as seen from the back.

In the LED substrate 327 according to the third embodiment, as shown in FIG. 7, on the front surface of the mounting section 327M, a conducting opening 329 is provided in an insulating base material covering a conductor pattern 328 formed on the LED substrate 327, so that a part of the ground section GND is exposed. It should be noted that the conducting opening 329 is provided in an inner region (upward in FIG. 7, rightward in FIG. 8) of the mounting section 327M and the LEDs 26 are mounted on the outside thereof.

In the liquid crystal display device 301 according to the third embodiment, as shown in FIG. 8, the liquid crystal panel 10 is fixed to the backlight device 320 by the liquid crystal panel fixing tape 30.

As in the case of the first embodiment, the front surface of the liquid crystal panel fixing tape 30 is fixedly attached so as to make contact with the conductive layer 13E of the back side polarizing plate 13. Meanwhile, the back surface of the liquid crystal panel fixing tape 30 is fixedly attached to the conductive layer 225E of the lens sheet 225 and a frame 321. As a result, the back side polarizing plate 13 and the lens sheet 225 are electrically connected to each other via the liquid crystal panel fixing tape 30. Moreover, as shown in FIG. 8, by the conductive layer 225E of the lens sheet 225 making contact with the conductive layer 24E of the diffusion sheet 24 under its own weight and, furthermore, the conductive layer 24E making contact with the conductive layer 23E of the light guide plate 23 under its own weight, the optical members 13 and 225 are electrically connected to the diffusion sheet 24, and by extension to the light guide plate 23.

In the liquid crystal display device 301 according to the third embodiment, the light guide plate 23 is fixed to the LED substrate 227 via the light guide plate fixing tape 331. Particularly, as shown in FIG. 8, a front surface of the light guide plate fixing tape 331 is fixedly attached so as to make contact with the conductive layer 23E of the light guide plate 23, and a back surface of the light guide plate fixing tape 331 is fixedly attached to the mounting section 327M of the LED substrate 327. In the mounting section 327M, the light guide plate fixing tape 331 is fixedly attached so as to make contact with a part of the ground section GND exposed from the conducting opening 329. As a result, the light guide plate 23 is electrically connected to the ground section GND of the LED substrate 327 via the light guide plate fixing tape 331.

Working Effects of the Third Embodiment

As noted above, unlike the first and second embodiments, the third embodiment makes it possible to make the liquid crystal display device 301 narrower in frame by disposing the LED substrate 327 closer to the back side than the light guide plate 23 in the backlight device 320. Meanwhile, as in the cases of the first and second embodiments, the optical members 13, 23, 24, and 225 are electrically connected to the ground section GND of the LED substrate 327 via the liquid crystal panel fixing tape 30 and the light guide plate fixing tape 331, which are fixing members, whereby electricity built up on the optical members can be effectively dissipated out of the liquid crystal display device 301.

As can be seen from the first, second, and third embodiments, the technology described herein is applicable regardless of where in a backlight device an LED substrate is disposed.

Other Embodiments

The technology described herein is not limited to the embodiments described above with reference to the drawings. The following embodiments may be included in the technical scope.

(1) Although, in each of the embodiments described above, each of the conductive layers E is formed all over the surface of a corresponding one of the optical members, this does not imply any limitation. Each of the conductive layers E is not limited to one provided on the surface of a corresponding one of the optical members, and a base material constituting an optical member or an optical sheet may be made to have electrical conductivity. Alternatively, such a configuration is possible that an electrically-conducting path is provided so that conductive layers formed on the front and back surfaces, respectively, are electrically continuous in a thickness direction. Further, for example, providing a conductive layer 22E also on at least the front surface of the reflection sheet 22 and bringing the conductive layer 22E and the conductive layer 23E into contact with each other in the first embodiment makes it possible to prevent electrostatic adsorption between the back surface of the light guide plate 23 and the front surface of the reflection sheet 22.

Further, although it is preferable that each of the conductive layers E be formed over the whole area of a corresponding one of the optical members, this does not imply any limitation. Although each of the embodiments described above has illustrated a configuration in which the conductive layers E are provided solidly, the conductive layers E may for example be provided in stripes as in the case of lighting curtains described, for example, in Japanese Unexamined Patent Application Publication No. 2002-258763, or may be disposed in predetermined patterns such as meshes.

(2) Although each of the embodiments described above has described an example in which a two-sided tape is used as a fixing member, this does not imply any limitation. For example, a conductive adhesive or the like may be used. Alternatively, a part of a bezel or the like, made of a conducting material such as metal, that fixes a liquid crystal panel to a backlight device may be provided with a structure that makes contact with an optical member and a ground section of a control substrate.

(3) The structure of a lighting device is not limited to one such as that described in each of the embodiments described above. For example, the lighting device may be a direct backlight device having a light source disposed on a back side of a light guide plate. Further, the lighting device may be one that has, instead of a frame or in addition to a frame, a box-shaped chassis (housing) including a bottom surface (back surface) on which a reflective sheet is stacked. An optical sheet is not limited to a diffusion sheet or a lens sheet illustrated in each of the embodiments described above, and the lighting device may include, instead of them or in addition to them, various types of optical sheet such as a prism sheet and a polarizing reflection sheet. Further, the lighting device may include a light source, such as a fluorescent tube, that is different from an LED. In a case where the lighting device uses an LED as a light source, the numbers and shapes of LEDs and LED substrates are not limited. An LED may be disposed to face end faces of the light guide plate. In a case where LED substrates are provided, a fixing member and a ground section of one LED substrate need only be connected to each other. However, from the point of view of more effectively preventing the build-up of electricity, it is preferable that ground sections of the LED substrates be electrically connected to an optical member via a fixing member.

(4) Although each of the embodiments described above is configured such that electricity built up on an optical member is dissipated through a ground section of an LED substrate serving as a control substrate, this does not imply any limitation. A control substrate having a ground section can be used in the technology described herein, and it may for example be a liquid crystal panel substrate for applying an electric field to a liquid crystal layer of a liquid crystal panel, a touch panel substrate for performing position detection and control of a touch panel attached to a liquid crystal panel, or the like.

(5) The shape(s) of a display device and/or a display panel is/are not limited to any particular shape(s), either. For example, the technology described herein is applicable to a display device including a display panel having a given shape such as a round shape, an elliptical shape or an indefinite shape in a plan view, and the display panel may be bent or curved in three dimensions.

(6) Although each of the embodiments described above has illustrated a case where the technology described herein is applied to a liquid crystal display device including a liquid crystal panel, the technology described herein is also applicable to a display device including another type of display panel (such as an organic EL panel, a PDP (plasma display panel), an EPD (electrophoretic display panel), or a MEMS (microelectromechanical system) panel).

The invention claimed is:

1. A display device comprising:
a display panel including a display region in which an image is displayed and a non-display region that surrounds the display region;
at least one optical member imparting predetermined optical effects to light emitted toward the display panel;
at least one fixing member fixing the at least one optical member to another member; and
a control substrate controlling display of the image, wherein
the control substrate includes a ground section including a conductor pattern, and
the at least one fixing member has electrical conductivity, electrically connects the at least one optical member directly or indirectly to the ground section, and is fixed to an entire length of the non-display region of the display panel for an entire length of an outer edge of the at least one optical member.

2. The display device according to claim 1, wherein
the at least one optical member includes a conductive section that transmits electricity built up on the optical member, and
the at least one fixing member is fixed to the conductive section of the at least one optical member.

3. The display device according to claim 1, wherein
the display panel is a liquid crystal panel including two substrates and a liquid crystal layer sealed between the two substrates,
the display device further comprises a lighting device disposed behind the liquid crystal panel on an opposite side from an image display surface of the liquid crystal panel on which the image is displayed to illuminate the liquid crystal panel with light,
the lighting device includes a light source and a light source substrate for controlling driving of the light source, and
the control substrate is the light source substrate.

4. The display device according to claim 3, wherein
the at least one optical member is a polarizing plate stacked on a rear side of the liquid crystal panel, and
the at least one fixing member is fixed to the polarizing plate to fix the liquid crystal panel to the lighting device.

5. The display device according to claim 4, wherein
the at least one fixing member that fixes the liquid crystal panel to the lighting device has a light blocking effect and is fixed to an outer edge of the polarizing plate that overlaps the non-display region of the liquid crystal panel for an entire length of the outer edge.

6. The display device according to claim 3, wherein
the at least one optical member is disposed in the lighting device, and
the at least one fixing member is fixed to the at least one optical member disposed in the lighting device.

7. The display device according to claim 6, wherein the lighting device includes a light guide plate that receives light from the light source and emits planar light toward the liquid crystal panel,
the at least one optical member is the light guide plate, and
the at least one fixing member is fixed to the light guide plate and the light source substrate to fix the light guide plate to the light source substrate.

8. A display device comprising:
a display panel including a display region in which an image is displayed and a non-display region that surrounds the display region;
at least one optical member being a polarizing plate stacked on a rear side of a liquid crystal panel to light emitted toward the display panel; and
at least one fixing member fixing the liquid crystal panel to a lighting device has a light blocking effect and is fixed to an outer edge of the polarizing plate that overlaps the non-display region of the liquid crystal panel for an entire length of the outer edge; wherein
the display panel is the liquid crystal panel including two substrates and a liquid crystal layer sealed between the two substrates,
the lighting device is disposed behind the liquid crystal panel on an opposite side from an image display surface of the liquid crystal panel on which the image is displayed to illuminate the liquid crystal panel with light,
the lighting device includes a light source and a light source substrate for controlling driving of the light source,
the light source substrate includes a ground section including a conductor pattern, and
the at least one fixing member has electrical conductivity and electrically connects the at least one optical member directly or indirectly to the ground section.

* * * * *